US 12,536,013 B2

United States Patent
Kaufman et al.

(10) Patent No.: US 12,536,013 B2
(45) Date of Patent: Jan. 27, 2026

(54) SYSTEMS AND METHODS FOR DEVICE CONFIGURATION USING A CONFIGURATION NORMALIZATION PLATFORM

(71) Applicant: Microsoft Technology Licensing, LLC, Redmond, WA (US)

(72) Inventors: Peter J. Kaufman, Sammamish, WA (US); Adrian F. Teran, Sammamish, WA (US); Yi Zhao, Medina, WA (US); Marius C. Niculescu, Redmond, WA (US); Shayak Lahiri, Redmond, WA (US); Sanghamitra Mukherjee, Redmond, WA (US); Matthew Wayman Reynolds, Maple Valley, WA (US); Haipeng Li, Redmond, WA (US); Daniel S. Dudugjian, Woodinville, WA (US); Riki June, Seattle, WA (US); Feng Yue, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 266 days.

(21) Appl. No.: 18/173,903

(22) Filed: Feb. 24, 2023

(65) Prior Publication Data
US 2024/0289125 A1     Aug. 29, 2024

(51) Int. Cl.
*G06F 8/71* (2018.01)
*G06F 9/54* (2006.01)

(52) U.S. Cl.
CPC ................ *G06F 8/71* (2013.01); *G06F 9/541* (2013.01)

(58) Field of Classification Search
CPC .................................. G06F 8/71; G06F 9/541
See application file for complete search history.

(56) References Cited

U.S. PATENT DOCUMENTS

| 9,378,276 | B1 * | 6/2016 | Mengle | G06F 16/951 |
| 2007/0283049 | A1 * | 12/2007 | Rakowski | G06F 9/44505 |
| | | | | 709/246 |

(Continued)

FOREIGN PATENT DOCUMENTS

DE    112018000233 T5 *  9/2019  ........... G06F 13/00

OTHER PUBLICATIONS

International Search Report and Written Opinion received for PCT Application No. PCT/US2024/015892, Jul. 8, 2024, 17 pages.

(Continued)

*Primary Examiner* — Qing Chen

(57) ABSTRACT

Examples of the present disclosure describe systems and methods for device configuration using a configuration normalization platform. In examples, a system receives, at a device, a configuration request from a first software platform having a first toolset. The configuration request includes a first SCP file in a format that is normalized horizontally with respect to a second software platform having a second toolset that is different from the first toolset. The system parses, based on an SCD document on the device, the first SCP file into an OM. The SCD file includes scenario metadata that is specific to the device. The system generates scenario instructions that are specific to the device by applying the scenario metadata to the OM and configures the device based on the scenario instructions.

20 Claims, 9 Drawing Sheets

(56) References Cited

U.S. PATENT DOCUMENTS

| | | | |
|---|---|---|---|
| 2014/0279808 A1 | 9/2014 | Strassner | |
| 2014/0325009 A1* | 10/2014 | Hood | H04L 51/56 |
| | | | 709/206 |
| 2020/0076913 A1* | 3/2020 | Trocki | H04L 67/55 |
| 2020/0098018 A1 | 3/2020 | Narula | |
| 2020/0133748 A1* | 4/2020 | Liebherr | G06F 9/546 |
| 2022/0407924 A1* | 12/2022 | Buchmann | G06F 16/288 |
| 2024/0028411 A1* | 1/2024 | Xu | G06F 8/71 |

OTHER PUBLICATIONS

International Preliminary Report on Patentability received for PCT Application No. PCT/US2024/015892, mailed on Sep. 4, 2025, 11 pages.

* cited by examiner

FIG. 2A
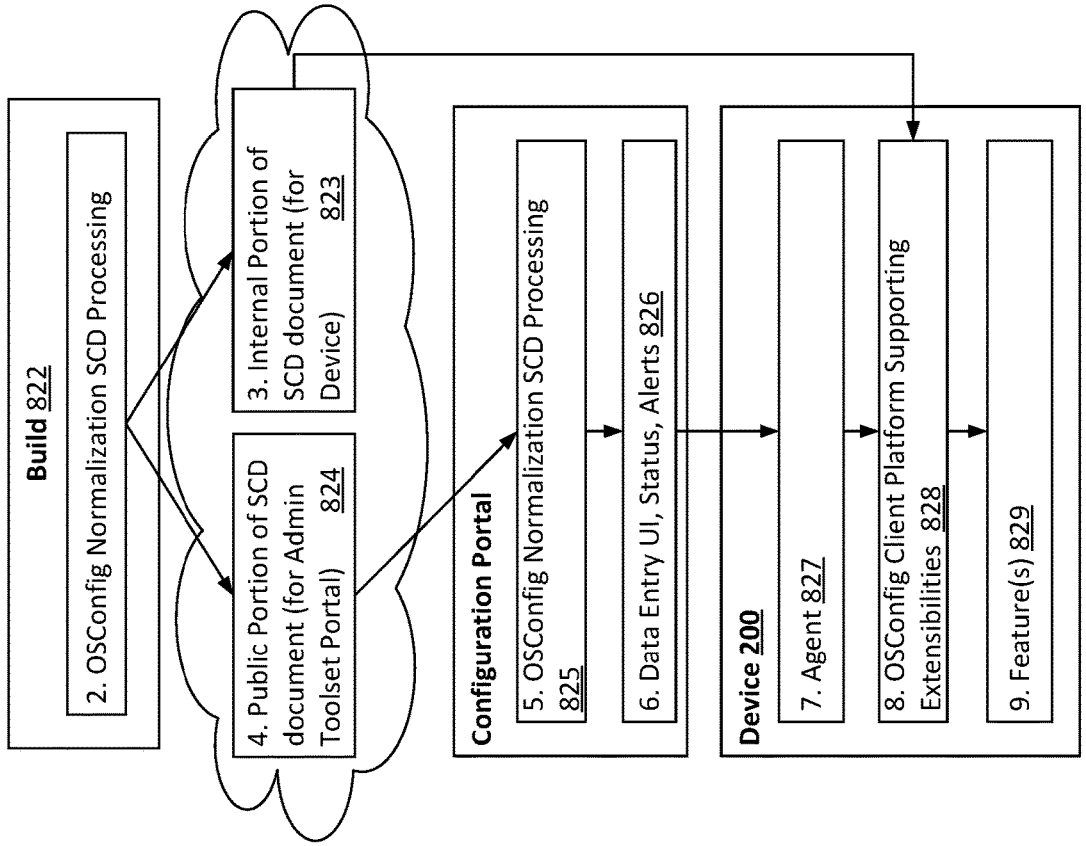
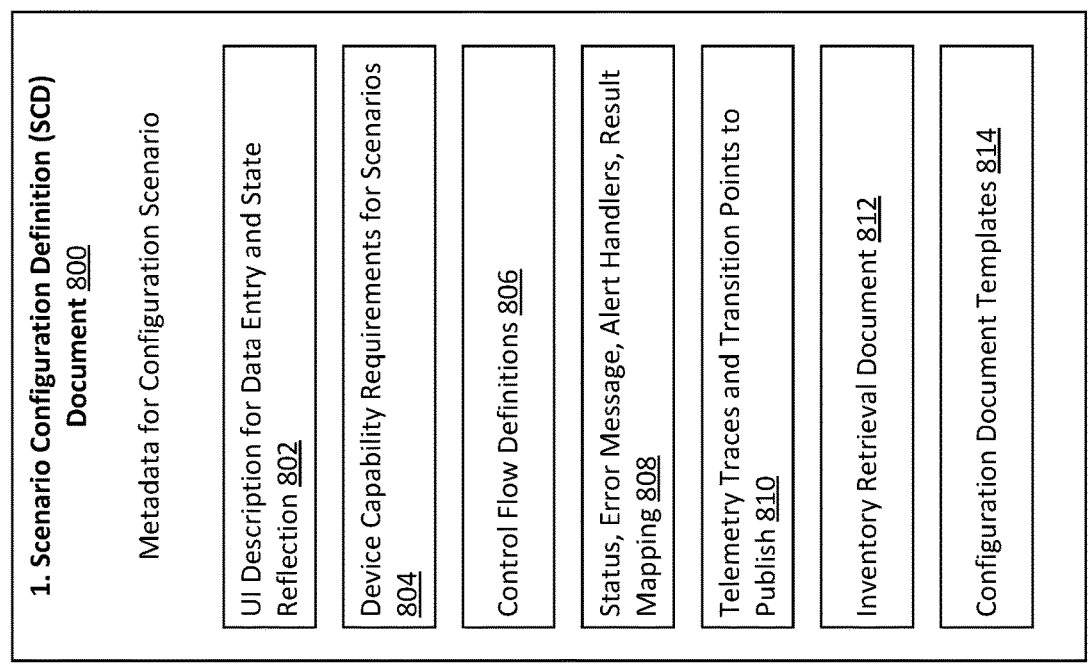

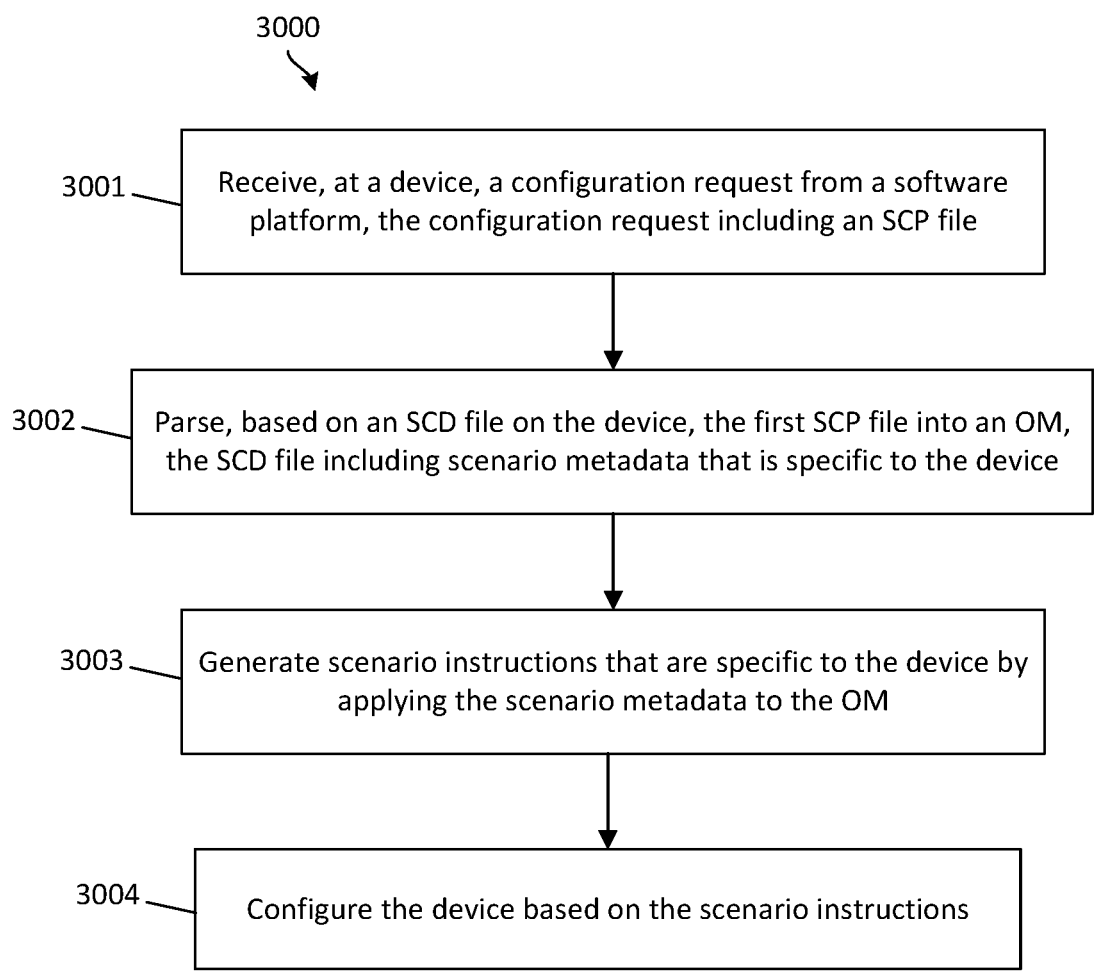

SYSTEMS AND METHODS FOR DEVICE CONFIGURATION USING A CONFIGURATION NORMALIZATION PLATFORM

BACKGROUND

Developing a new feature for a software platform may involve configuring, testing, revising, and reconfiguring a chain of software components (referred to as a "toolchain" or a "toolset"). A toolset includes software components on the software platform and/or software components on a specific device. After much time and effort, feature development teams with deep knowledge of a specific toolset for a specific software platform and a specific device eventually arrive at a new feature that successfully delivers a desired utility within a specific ecosystem. However, configuring a device with a new feature to function across different software platforms may involve a significantly greater investment in time and resources, encompassing multiple ownership layers across feature development teams and organizations.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for device operating system (OS) configuration ("device configuration") using a configuration normalization platform. In examples, a device receives a configuration request from a software platform. The configuration request includes a scenario configuration payload (SCP) file (e.g., an SCP document), including a format that is normalized horizontally with respect to other software platforms. Some of the other software platforms may have toolsets that are configured differently for the same feature. The device includes a configuration normalization platform. An application programming interface (API) of the configuration normalization platform is configured using the SCP document. The API calls a parser of the device to parse the SCP document into an object model (OM). A scenario configuration definition (SCD) document (e.g., an SCD file), including scenario metadata, is stored in a storage associated with the device. Some of the scenario metadata are applied to the OM to generate scenario instructions. The device is configured based on the scenario instructions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description, which follows, and, in part, will be apparent from the description, or may be learned by practice of the disclosure.

BRIEF DESCRIPTION OF THE DRAWINGS

Examples are described with reference to the following figures.

FIG. 2A illustrates example contents of a scenario configuration definition document along with an example process flow corresponding to build aspects, configuration portal aspects, and device aspects associated with the scenario configuration definition document.

FIG. 3 illustrates an example method for executing device configuration using a configuration normalization platform.

DETAILED DESCRIPTION

Figure 1:
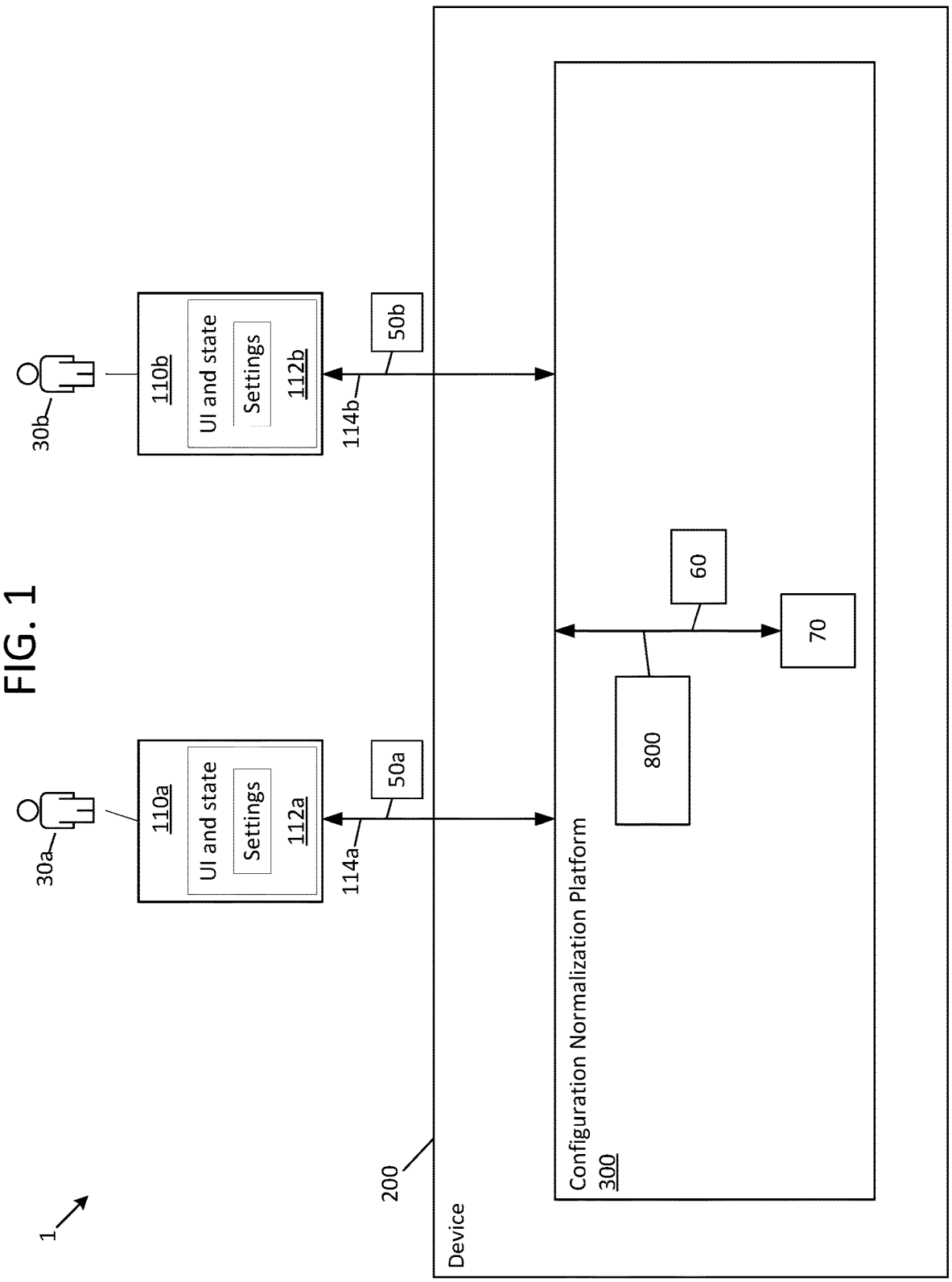
FIG. 1 illustrates an overview of an example system for device configuration using a configuration normalization platform.

Developing a feature (e.g., an operating system feature) can be a costly, error-prone process for individual feature teams. Feature development complexities are often compounded if a feature is to be supported through multiple toolsets. A toolset (which is also referred to as a toolchain), as used herein, refers to a chain of software components, interoperating to enable a device to perform tasks associated with a specific software feature. For example, a desktop shell, which provides a graphical user interface between features of a device operating system and a device user, is a common toolset. Feature teams often spend considerable development, product management (PM), and data integration (DI) resources to understand the details of targeted configurations. A configuration, as used herein, refers to a state of software components of a toolset that interact with an operating system to enable functionality associated with a specific feature. The feature development process typically involves users (e.g., product managers and developers) of various features engaging with the users of targeted configurations, wherein each targeted configuration has different capabilities and functionalities from other targeted configurations. As such, feature integration through multiple toolsets increases the potential for behavior inconsistencies across toolsets supported by a device, which can frustrate customers and consume customer support resources. The feature development process is plagued by issues that increase the potential for behavioral inconsistencies across toolsets. For example, a scenario for implementing a configuration on one toolset may not be guaranteed to work on a different toolset. A scenario, as used herein, refers to a sequence of transition states to be implemented across a single component or multiple components of a toolset that interact with an operating system to apply a specific configuration. In addition, adoption of scenarios may vary across toolsets (e.g., administration toolsets). For example, different authorities may use a different administration toolset (e.g., a toolset associated with a specific authority) from each other. An authority, as used herein, refers to an entity (e.g., organization, group, or personnel) having administrative rights and capabilities with respect to a software platform. For example, a scenario developed for a particular administration toolset may not be "turn-key" to work on any other administration toolsets impacting an operator (e.g., a customer). In other words, an update made to one administration toolset associated with a device might conflict with another administration toolset that is also associated with the device.

Additionally, a toolset may not support a scenario developed for another toolset or may not update as often as another toolset. Device registration and subsequent querying/targeting of devices may not be consistent across toolsets. Operating system components may have direct knowledge of the setting stores, which makes it difficult to change the setting stores to a more secure mechanism and provide default values per platform. For example, many operating system components may include hard-coded values (e.g., file locations and parameter values) that would render the operating system components inoperable if the setting stores corresponding to the hard-coded value were changed. Moreover, there is currently no consistent abstraction layer available across software platforms to provide a generalized interface between a device and software platforms associated with the device. A software platform, as used herein, refers to software provided by a specific authority that provides functionality for a device (e.g., a user device) to perform various automated tasks. There is no standard to detect, remediate, and report when a configuration is modified maliciously, unintentionally, or due to investigation. There is no standard to resolve configuration conflicts. Different toolsets may offer different degrees of configuration monitoring and remediation.

Furthermore, there is no central source of truth for a configuration. For example, a development history and state information regarding a configuration may be unavailable with respect to one or more toolsets. Toolsets may reflect the configuration being applied but may fail to identify or report (e.g., fail to surface) the actual resulting state from the configured device. As another example, there is no standard configuration model describing a scenario end to end (e.g., including configuration data entry or user access controls, configuration-toolset-to-device protocols, error handling, telemetry or monitoring, and conflict resolution). There is also no standard that describes simultaneous configuration between authorities with respect to precedence, conflict resolution, and scope. Enforcement of scenarios by operating system components and applications does not provide a formal model that signals when an atomic set of settings are available to process. There is no standard configuration extensibility model allowing for improvement of configurations. There is no formal "language" describing scenarios in a data-driven fashion to allow feature teams across disciplines (e.g., PM, Development, or DI) to form a common understanding regarding supported tooling to leverage a described scenario.

Embodiments of the present disclosure address the challenges of the above-described implementation approaches and describe systems and methods for device configuration using a configuration platform ("configuration normalization platform"). A configuration normalization platform, which provides a standard model for configuration based on a scenario configuration definition (SCD) standard, is described. The SCD describes the toolset (e.g., administration toolset) interaction with the operating system to achieve a desired state in a standardized format. In other words, the SCD describes the scenario to achieve the desired configuration in a standardized format. The SCD standard enhances the various solutions that toolsets (e.g., administration toolsets) provide by improving interoperability between toolsets.

In some examples, software components are provided that help drive scenarios through the configuration lifecycle from development through the scenario lifetime and through updates to the configuration. An SCD standard enables day-one onboarding of a configuration. To wit, because the SCD standard is shared between toolsets, features behave consistently across targeted toolsets (e.g., across administration toolsets or software platforms) without further development of the feature. In some examples, scenarios are described by a portion of an SCD document that is made available for consumption by other software platforms. The SCD document describes the data model, schema, and/or scenario interaction with the operating system. A toolset may publish a scenario into a software repository for other toolsets to leverage.

In some examples, software components of a configuration normalization platform include an orchestrator to coordinate a given scenario. In some examples, the configuration normalization platform uses the SCD document to ensure the desired configuration expressed in the SCD document is achieved using a minimum level of access or permission. For example, the configuration normalization platform allows multiple software platforms to configure a device using the lowest level of access permitted by the device. A software platform may be authenticated with expressed privileges, such as user-based access control (e.g., role-based access control (RBAC)).

In some examples, an SCD document and payload templates for creating SCP files are generated at post-development or deployment (e.g., at build time or compile time), by leveraging the SCD standard. Metadata is used at build time or compile time to analyze for conflicts with other scenarios. The metadata is securely stored for an orchestrator and security processes to use in detecting unexpected (e.g., erroneous or malicious) scenarios. For example, stored metadata can be used to validate configuration requests to identify and prevent erroneous or malicious configuration requests.

To mitigate distribution fragmentation challenges, scenarios for some software platforms (e.g., Linux) are encapsulated vertically such that a configuration is limited to or visible by a single software platform of a system. That is, a single software platform is configured to have a vertical control over the configuration, and any other software platform that attempts to configure settings related to the vertical control is rejected.

In some examples, a common registry is provided for all devices and/or operating systems. The registry, platform-as-a-service models, scenario models, data models, and schema are published (or otherwise made available) to a repository and consumed by an API layer and a corresponding toolset (e.g., administration toolset). Thus, the registry can be leveraged by services (e.g., services provided by toolsets) in the configuration normalization platform.

Embodiments of the present disclosure enable systems with one or more of the following benefits. As feature teams develop a feature for various versions of different software platforms, an end-to-end configuration history that is secure, accurate, and consistent is provided for the feature. Configuration history is provided in lock step with the feature development process, from planning to device imaging and deployment. Such a configuration history enables security monitoring, auditing, telemetry, and supportability afterward. Details regarding toolset configurations and toolset capabilities (e.g., how a device can be configured or reconfigured for a given feature) are provided end to end (e.g., from the administration user interface (UI) to the device) early in the development cycle. For example, feature teams are provided with detailed information regarding a toolset, including information about the UI and the operating system components of the toolset and their reconfiguration capabilities, at an early stage of development to facilitate feature development and deployment.

Thus, the present disclosure provides a plurality of technical benefits and improvements over previous device configuration solutions. These technical benefits and improvements include: (i) enabling a standard device configuration platform for scalable, efficient, secure, reliable, and consistent feature development across software platforms; (ii) providing a general abstraction layer to all software platforms while enabling encapsulation for feature development; (iii) enabling day-one configuration based on a data driven model; and (iv) enabling seamless device mobility across software platforms, among other examples.

Figure 5:
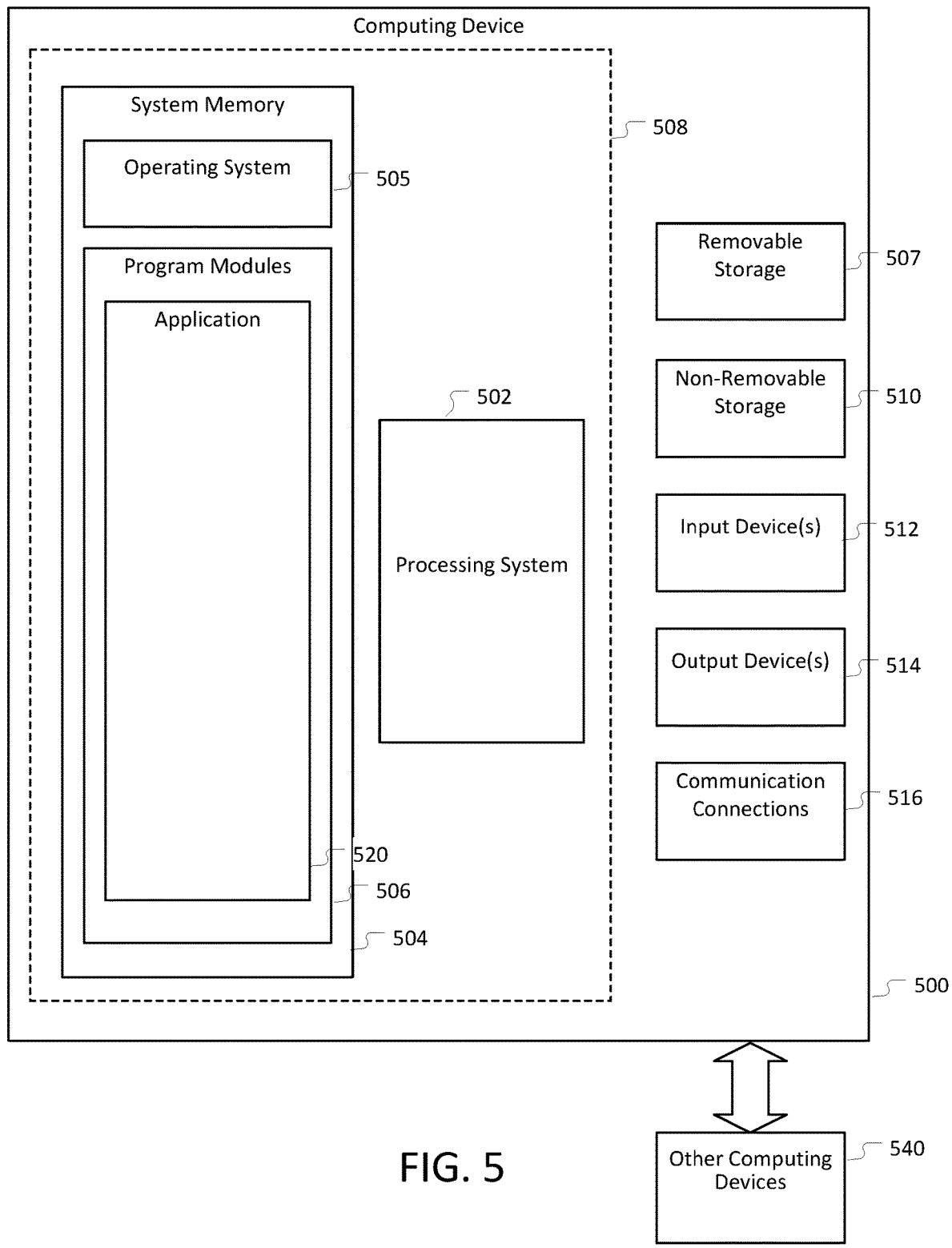
FIG. 5 is a block diagram illustrating example physical components of a computing device for practicing aspects of the disclosure.

FIG. 1 illustrates an overview of an example system 1 for device configuration using a configuration normalization platform 300. Example system 1 as presented is a combination of interdependent components that interact to form an integrated whole. Components of system 1 include hardware components or software components (e.g., applications, APIs, modules, virtual machines, or runtime libraries) implemented on and/or executed by hardware components of system 1. In one example, components of systems disclosed herein are implemented on a single processing device. The processing device provides an operating environment for software components to execute and utilize resources or facilities of such a system. Examples of processing device(s) including such an operating environment are depicted in FIGS. 5 and 6B. In another example, the components of systems disclosed herein may be distributed across multiple processing devices. For instance, input may be entered on a user device (which is also referred to as a client device) and information may be processed on or accessed from other devices in a network, such as one or more remote cloud devices or web server devices.

In FIG. 1, system 1 includes software platforms 110 (individually depicted as 110a and 110b). Each software platform 110 is associated with a respective authority 30 (individually depicted as 30a and 30b). In examples, authority 30 is tasked with, among other things, developing and implementing new software features. Each software platform 110 is associated with a toolset 112 (individually depicted as 112a and 112b). In examples, each authority 30 has deep knowledge of components in its respective toolset 112 but may not have deep knowledge of components in the toolsets 112 of other software platforms 110. Each software platform 110 is configured to send configuration requests 114 (individually depicted as 114a and 114b) to a device 200. A configuration request includes a request by authority 30 to make a modification to a toolset 112 that is associated with the authority 30. Although the present disclosure focuses on configuration requests, it should be understood that each software platform 110 is also configured to send inventory requests. An inventory request is a read-only request to retrieve data associated with the toolset.

Each configuration request includes an SCP document 50 (individually depicted as 50a and 50b). An SCP document 50 associated with one or more software platforms 110 is normalized with (e.g., across) one or more other software platforms 110. That is, each SCP document 50 is in a format that is normalized horizontally with respect other software platforms 110. In some examples, an SCP document 50 is normalized by way of a common set of name-value pairs. The name-value pairs describe one or more scenarios for device configuration. Accordingly, an SCP document 50 enables the implementation of a general abstraction layer that allows software platforms 110 to query a state of the device 200 or to configure the device 200 to a desired state. For example, a specific SCP document 50 allows for device configuration based on defined scenarios. Thus, the SCP document 50 provides for well-defined scenarios.

Each software platform 110 is communicably coupled with a configuration normalization platform 300 on the device 200. As discussed in further detail below, with respect to FIG. 2B, the configuration normalization platform 300 is configured to produce (e.g., generate) an object model (OM) 60 based on a specific SCP document 50 and based on scenario metadata from an SCD document 800, which is described in more detail below in reference to FIG. 2A. The SCD document 800 is stored on the device 200. In some examples, the SCD document 800 is stored on the device 200 at a time period corresponding to an operating system installation. In such examples, the SCD document is associated with a device image of the device 200. In some examples, the SCD document 800 is stored on the device 200 during runtime. The configuration normalization platform 300 processes the OM 60 using scenario metadata from the SCD document 800 to generate scenario instructions 70. The configuration normalization platform 300 uses the scenario instructions 70 to configure the device 200 in accordance with a specific configuration request 114. Accordingly, a scenario component of the device 200, corresponding to a specific feature update associated with a specific configuration request 114, is implemented in the device 200.

FIG. 2A illustrates example contents of the SCD document 800 along with an example process flow corresponding to build aspects, configuration portal aspects, and device aspects associated with the SCD document 800. The SCD document 800 is associated with an SCD standard. For example, the SCD document 800 includes detailed scenario configuration information developed by software development teams and provided in accordance with a standard. The SCD is effectively a description of everything involved with fulfilling a scenario from configuration requests 114 (see FIG. 1) and/or from inventory requests. The SCD document 800 defines the payload that is passed into the configuration normalization platform to process a given scenario associated with a configuration request.

The SCD goes through a preprocessing or build process to make its scenario metadata available to the configuration normalization platform. The SCD document 800 contains descriptions of configuration request payloads and/or inventory request payloads. For example, the SCD document 800 may comprise a data schema that describes the expected or allowed data fields in a payload (e.g., a configuration request payload or an inventory request payload) and enforces a data format for the data fields. These SCD descriptions (or schemas) are used to validate the SCP documents 50. For example, in some embodiments, the configuration normalization platform 300 may reject a payload that does not include the expected data, data fields, or data format. The SCD descriptions are used to drive each specific scenario. For example, the SCD describes multiple scenario instances, and an SCP document provides information regarding one particular scenario instance. The SCP document provides configuration data at a high level (e.g., an abstract level) that is in a format described by the SCD document 800. In some examples, the SCP document includes a tag associating it with the SCD document 800. The SCD document includes detailed scenario configuration metadata that provides specific detailed device configuration information.

The SCD document 800 includes one or more of: a user interface description 802, which describes SCP document formatting for data entry and state reflection (e.g., to bind data to SCD document values); device capability requirements 804 for one or more scenarios; control flow definitions 806 with conditional logic support; administrator interactive messaging 808, such as status messaging, error messaging, alert handlers, result mapping (e.g., mappings representing the error codes and/or completion statuses of functions and other computer code, and/or the like), telemetry traces and transition points to publish 810 (e.g., the SCD document 800 may define whether sequence diagrams may be converted to traces); inventory retrieval documents 812 (e.g., documents to retrieve device capabilities and current state); and configuration document templates 814 (e.g., documents templates to configure the OS desired state, with configuration data being supplied through data entry and other sources). The inventory retrieval documents 812 and the configuration document templates 814 correspond to the data that is passed into the configuration normalization platform by way of SCP documents.

To create and process the SCD document 800, a feature team works to create the SCD document 800 based on feature scenarios. The SCD document 800 describes a feature to be configured on a device 200. In some examples, a build process 822 is used, during which the SCD document 800 is "compiled" for validation of the SCD (e.g., the SCD associated with the SCD document 800) against a schema to make sure that the SCD is properly formatted and that the SCD contains all the required data. In other examples, a build process 822 is not used. Instead, the SCD document 800 is received pre-compiled or the SCD document 800 is formatted in an interpreted language (e.g., the SCD document 800 is written in software language that is interpreted by an interpreter component without being built or compiled). The SCD document 800 formatted in the interpreted language is then validated against a schema as described above.

If the SCD passes validation, an internal portion of the SCD document 823 may be added to an OS image (which is not illustrated). In examples, the internal portion of the SCD document 823 includes a private (e.g., non-public) portion of SCD metadata associated with the SCD document 800. When the OS image is applied or installed on the device 200, and the OS image is executed on the device 200, the configuration normalization platform 300 has access to the private portion of the SCD metadata to direct the configuration normalization platform 300 to properly configure the feature that is related to (e.g., described by) the SCD document 800. In some examples, a public portion of the SCD document 824 is hosted by a cloud service and/or control flow definitions 806 are stored on the device 200. In at least one example, control flow definitions 806 are consumable by a second party through a cloud service. For example, data-entry metadata is published through a cloud service to enable toolsets to consume the published metadata in order to automatically render a UI in a data driven manner on day one of the release of the feature. In some examples, other types of metadata are not published because they are intended for internal usage by the device platform (e.g., private metadata).

In some examples, the SCD document 800 is stored on the device 200 at a time period corresponding to the OS installation. The public portion of the SCD document 824 is made available for a software platform (e.g., a toolset portal or an administration toolset portal) to consume and to programmatically provide a UI for data entry, querying state and status of the feature, and so on. At operation 825, the software platform consumes the public portion of the SCD document 824 by using abstraction components of the configuration normalization platform 300 corresponding to the software platform (e.g., corresponding to the toolset or administration toolset). At operation 826, the software platform leverages metadata to create the desired inventory and configuration documents for the configuration normalization platform 300 (e.g., a client configuration normalization platform or a core platform) to consume. At operation 827, a client agent passes document payloads to the configuration normalization platform 300. For example, in some embodiments, each software platform 110 (see FIG. 1) has a corresponding client agent on the device 200. Each client agent is configured to communicate between a respective software platform 110 and the configuration normalization platform 300 on the device 200. The client agents are configured to communicate with the configuration normalization platform 300 via a configuration-normalization-platform API 302 (see FIG. 2B) of the configuration normalization platform 300.

At operation 828, the configuration normalization platform 300 (e.g., the core platform) interacts with configuration normalization extensibility providers to manage the feature. At operation 829, the feature is configured on the device 200. In some embodiments, the configuration normalization platform 300 includes a notification handler and settings retrieval API to call components for enforcing a configuration request. Accordingly, scenario components of the device 200, corresponding to specific feature updates associated with a specific configuration request 114, are implemented in the device 200.

Figure 2B:
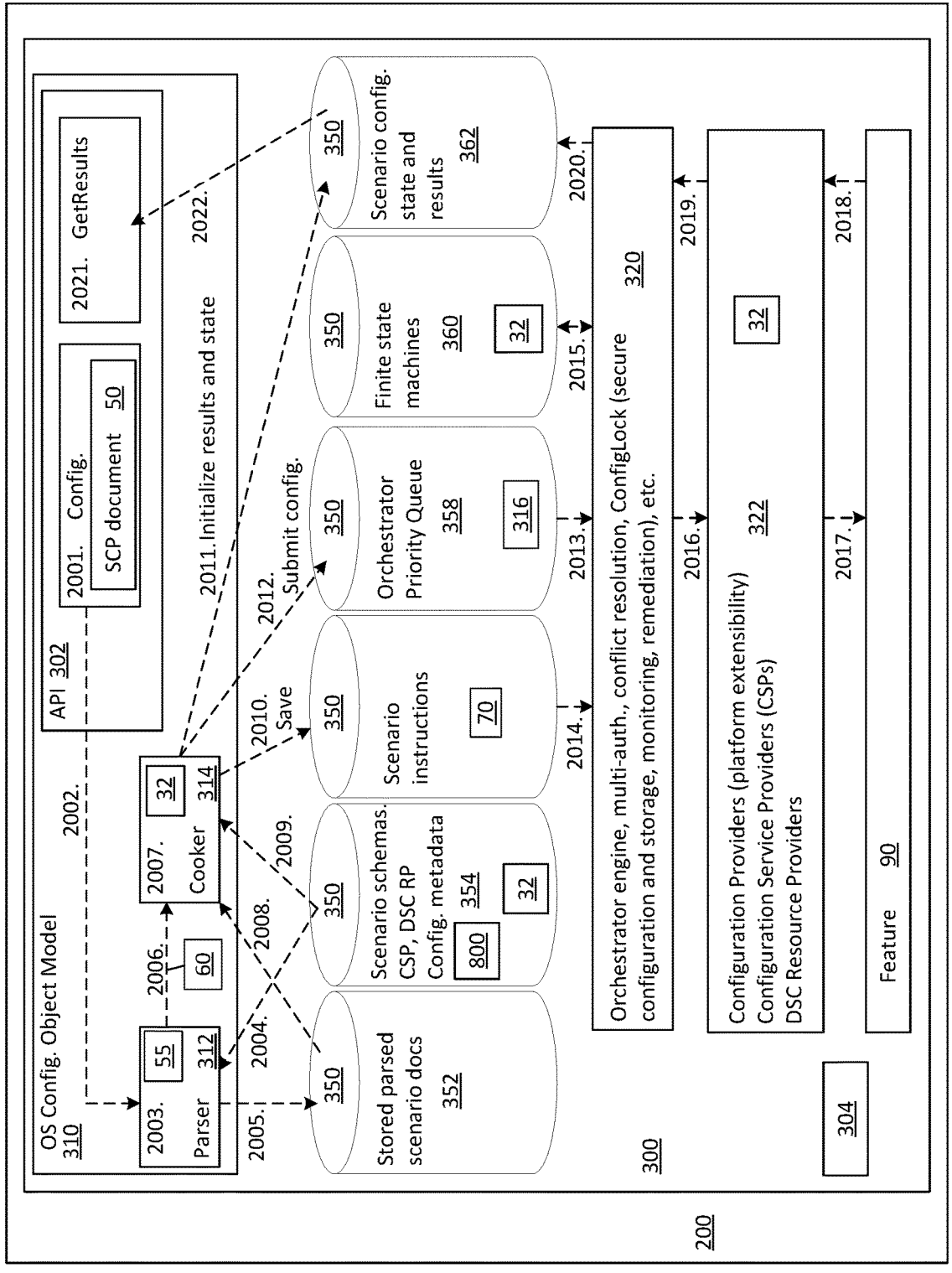
FIG. 2B illustrates an example process flow for device configuration using a configuration normalization platform within an example system.

FIG. 2B illustrates an example process flow for device configuration using a configuration normalization platform 300 within the example system 1. In some examples, the configuration normalization platform 300 includes an OS configuration object model layer 310. The OS configuration object model layer 310 includes an interface configured to allow for communication between software platforms 110 (see FIG. 1) and the device 200. For example, the OS configuration object model layer 310 includes the API 302.

A method 2000 for device configuration using a configuration normalization platform 300 includes one or more of the following operations. One or more of the software platforms 110 sends a configuration request 114 (see FIG. 1) to the device 200 by calling into the OS configuration object model layer 310 and passing in an SCP document 50 (operation 2001). In some examples, the SCP document 50 comprises a set of name-value pairs associated with a scenario. The scenario is defined by the SCD.

A parser 312 parses the SCP document 50 (operations 2002 and 2003) into an OM 60. The device 200 includes a storage 350, which serves as a centralized data store for settings, results, and metadata. In some examples, the OM 60 is persisted in storage 350 as parsed scenario documents 352. In some examples, if the SCP document is successfully parsed, the original SCP document 50 is stored in another data store (not illustrated) and is retrievable by the API 302 if needed. In some examples, the SCP document 50 is associated with (e.g., includes) scenario configuration code 55 that includes JavaScript Object Notation (JSON) code or extensible markup language (XML) code. In some examples, specific scenario metadata 354 and related information for SCD document 800 (e.g., scenario schemas, configuration service providers (CSPs), a desired state configuration (DSC) resource provider (RP), configuration metadata) is stored in a configuration metadata data store on the device 200 (e.g., during OS installation or during runtime). For example, specific scenario metadata 354 and related information are stored in the storage 350.

In some examples, as discussed above with respect to FIG. 2A, some of the specific scenario metadata 354 is created by a scenario owner or a feature team. The parser 312 retrieves the specific scenario metadata 354 from a configuration metadata store corresponding to scenario schema defined in the SCD (operation 2004). The parser 312 ingests the specific scenario metadata 354 (e.g., scenario schema metadata) and uses the specific scenario metadata 354 to validate the scenario configuration code 55 (operation 2004). In some examples, the parser 312 validates the SCP document 50 or the OM 60 using the specific scenario metadata 354 by determining whether all necessary values have been received or the types of the name-value pairs are correct. For example, the SCP document 50 or the OM 60 are verified against the specific scenario metadata 354 to determine whether there are errors in the SCP document 50 or the OM 60. The parser 312 is configured to return an error notification to an API of the OS configuration object model layer 310, based on the results of validating the scenario configuration code 55. For example, each setting corresponding to a given scenario is tied to a CSP or an RP to process the setting. Prior to the processing, setting values are validated to determine whether corresponding types and values match types and values expected by the CSP or RP.

After parsing the scenario configuration code 55 into the OM 60, the parser 312 stores the OM 60 (the actual parsed metadata, e.g., document object, associated with the SCP document 50) in the parsed scenario documents 352 of the storage 350 on the device (operation 2005). The OM 60 is transferred to (e.g., retrieved by) a cooker 314 (operations 2006, 2007, and 2008). A cooker, as used herein, refers to a software component that is configured to process the OM 60 with additional metadata. For example, the cooker 314 processes the OM 60 using scenario metadata from the SCD document 800 to generate the scenario instructions 70. In some examples, the cooker 314 retrieves other specific scenario metadata 354 that is suitable for processing the configuration request 114 (operation 2009). For example, other specific scenario metadata 354 may include additional metadata: for handlers of operations, indicating that a reboot is suitable after processing the configuration request 114, indicating certain settings to be executed successfully together, etc. (operation 2009). In such examples, the cooker 314 applies the other specific scenario metadata 354 to the OM 60 to create (e.g., generate or build) curated scenario instructions 70 (e.g., cooked instructions) (operations 2009 and 2010). In some examples, the cooked instructions comprise name-value pairs applied in a specific order, atomicity, additional operations, etc. (operations 2009 and 2010). In other words, the operations of the parser 312 and the cooker 314 assist in converting the configuration request 114 from abstract instructions that are normalized with respect to any toolset 112 (see FIG. 1) to specific instructions for configuring the device 200 (operations 2001-2010).

The cooker 314 processes the scenario instructions 70. In some examples, the cooker 314 stores the scenario instructions 70, and corresponding initial results, in the storage 350 on the device 200 (operation 2010). The cooker 314 then initializes a result location for the configuration (operation 2011) and provides an orchestrator priority queue 358 with location information to reference the scenario for processing (operation 2012). The orchestrator 316 uses the scenario instructions 70 to configure the device 200 in accordance with a specific configuration request 114. In some examples, the cooker 314 triggers the orchestrator 316 to process the curated scenario instructions 70 by sending a request to the orchestrator priority queue 358 (operations 2012 and 2013). In such examples, the scenario instructions 70 are executed in accordance with (e.g., based on an order of) the orchestrator priority queue 358. The orchestrator priority queue 358 handles the prioritizing of configuration requests 114 from multiple software platforms 110 and for multiple features 90. The cooker 314 creates a complete set of scenario instructions 70. The orchestrator 316 retrieves the scenario instructions 70 after pulling a configuration request (or inventory request) from the orchestrator priority queue 358. For example, the orchestrator priority queue 358 contains references to the configuration request (or inventory request). In some examples, the request is a key to particular scenario instructions 70 to be processed by the orchestrator 316.

The orchestrator 316 retrieves the scenario instructions 70 (e.g., the cooked instructions) when the orchestrator 316 is triggered (operation 2014). The orchestrator 316 then retrieves curated data (e.g., metadata) from the scenario instructions 70, and configures the device 200 by executing the scenario instructions 70. In some examples, the orchestrator 316 retrieves finite state machines (FSMs) 360, which are specified in the SCD document 800, for configuring the device 200 (operation 2015). In such examples, the SCP document 50 includes a reference to the SCD document 800, which enables the orchestrator to determine what FSMs to use for a given configuration request or inventory request.

The orchestrator 316 is the main engine for processing the scenario instructions 70, the curated data, and FSMs 360 to configure the device 200. In addition to providing the main processing engine, the orchestrator 316 provides additional functions. For example, the orchestrator 316 also provides multi-authentication, conflict resolution, secure configuration, storage monitoring, and remediation. In some examples, the orchestrator 316 configures the device 200 using (e.g., by calling) various resource providers 322 (e.g., configuration providers, configuration service providers (CSPs), DSC RPs, etc.) to configure the device OS (operation 2016). The configuration normalization platform 300, thus, configures the OS of the device 200 with a feature 90 (operation 2017), such as a security update. In some examples, the cooker 314, the storage 350, and the feature 90 may include extensibility points 32. Extensibility points provide flexibility to fulfill a specific scenario. In some examples, the configuration normalization platform 300 includes a notification handler and settings retrieval API 304 to call components for enforcing a configuration request 114.

In some examples, when configuration settings are completed on the device 200, the results (including a state of the device 200) are be stored to a scenario configuration state and results portion 362 of the storage 350 (operations 2018-2020). The results may then be retrieved by any of the software platforms 110 via an API (e.g., a GetResults API) (operations 2021 and 2022).

FIG. 3 illustrates an example method for executing device configuration using a configuration normalization platform. A method 3000 for device configuration using a configuration normalization platform 300 includes the following operations. The device 200 receives a configuration request 114a (see FIG. 1) from a first software platform 110a having a first toolset 112a (operation 3001). The configuration request 114a includes an SCP document 50a in a format that is normalized horizontally with respect to a second software platform 110b having a second toolset 112b that is different from the first toolset 112a (operation 3001). A parser 312 (see FIG. 2) of the device 200 parses the SCP document 50a into an OM 60, based on device-specific scenario metadata from an SCD document 800 stored on the device 200 (operation 3002). The configuration normalization platform 300 generates scenario instructions 70 that are specific to the device 200 by applying the specific scenario metadata 354 to the OM 60 (operation 3003). The configuration normalization platform 300 configures the device 200 based on the scenario instructions 70 (operation 3004).

Figure 4:
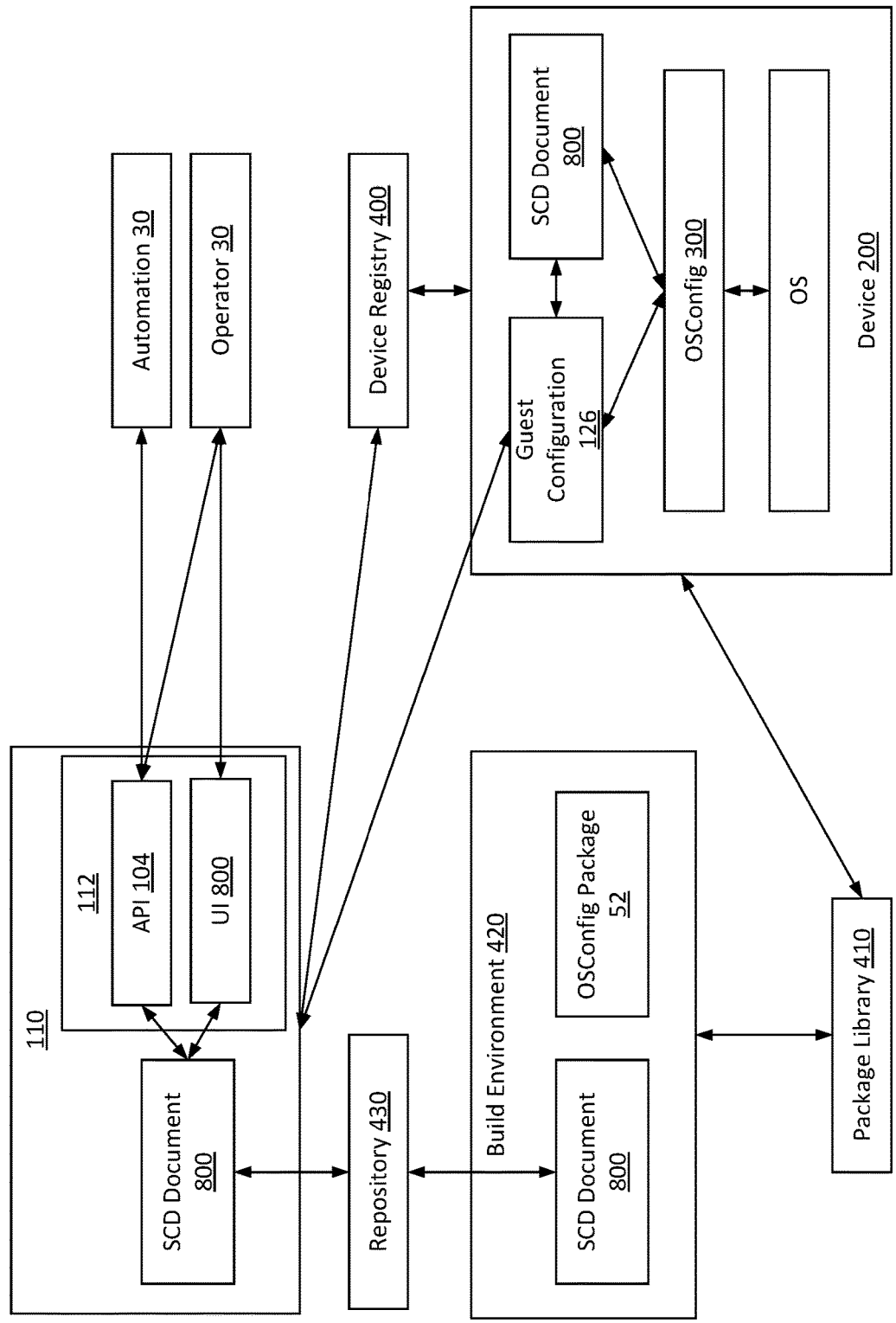
FIG. 4 illustrates an overview of an example system for building and publishing an SCD for device configuration using a configuration normalization platform.

FIG. 4 illustrates an overview of an example system for building and/or publishing an SCD for device configuration using a configuration normalization platform 300. In some examples, the SCD is built, by a feature team, during a building stage based on feature scenarios. In such examples, the system 1 compiles binaries and data-models for an SCD in build environment 420. The system 1 publishes configuration packages 52 associated with the compiled binaries and data models to a package library 410. The system 1 also publishes SCD document 800 associated with the compiled binaries and data models to a software repository 430 to enable collaborative development of improved scenarios or new scenarios for future configurations. The build process may enable the system 1 to provide day-one configuration of features to a software platform 110. In addition, the build process enables the validation of scenarios, auditing, upgradability, and diagnostics. In some examples, upon completion of new or improved scenarios, scenario metadata corresponding to the new or improved scenarios is saved from the build environment 420 or the software repository 430 to the device 200. In some examples, the new or improved scenario metadata may be saved to the storage 350 (see FIG. 2).

In other examples, the SCD is received pre-compiled or the SCD is formatted in an interpreted language that can be interpreted by the normalization platform 300 without the normalization platform 300 needing to build or compile the SCD. For example, instead of compiling the SCD in build environment 420, the system 1 receives an SCD, an SCD document 800, or a configuration package 52 associated with the SCD from a user or a third party. The SCD, the SCD document 800, and/or the configuration package 52 are not compiled and do not comprise compiled code. The system 1 publishes the SCD document 800 to repository 430 and/or publishes the configuration package 52 to package library 410. The system 1 validates the SCD, the SCD document 800, and/or the configuration package 52 using an SCD description or schema associated with the SCD to ensure that the SCD is properly formatted and contains the expected information.

In some examples, a software platform 110 ingests and processes each SCD document 800. Processing each SCD document 800 results in the generation of client and service directives. In some examples, the software platform 110 generates a software platform user interface (UI) 102 based on a specific scenario. For example, the SCD document 800 includes metadata to direct a UI portal to present scenario messaging. The scenario messaging includes data entry metadata in which data entered by a user is validated. The SCD document 800 includes metadata that enables user-facing portals to gather data needed for a given scenario to be configured. The software platform 110 applies validation schema to a software platform API 104. The software platform 110 enforces configuration sequences and relations for complex scenarios.

In some examples, a device 200 is registered, at a device registry 400, as a resource of a software platform 110. The device 200 is surfaced as a resource to a resource manager of the software platform 110. In some examples, servers, desktops, containers, virtual machines (VM), and Internet of Things (IoT) devices are also registered and available for discovery and queries from registration at device registry 400. Operators associated with an authority 30 may query devices and apply a desired configuration based on device capabilities.

In some examples, an agent 126 establishes a configuration channel (protocol) to a software platform 110 and applies a configuration through a configuration normalization platform 300. In such examples, the configuration normalization platform 300 receives an SCP from the agent 126. The configuration normalization platform applies configurations associated with the SCP and makes corrections to ensure compliance with SCD schemas. In at least one example, the agent 126 is extensible to handle multiple configuration flows and is generalized (or a new agent is created) to enable plugins to handle new SCDs.

FIG. 5 is a block diagram illustrating example physical components of a computing device for practicing aspects of the disclosure. The computing device components described below may be suitable for the computing devices and systems described above. In a basic configuration, the computing device 500 includes a processing system 502 comprising at least one processing unit and a system memory 504. Depending on the configuration and type of computing device, the system memory 504 may comprise volatile storage (e.g., random access memory), non-volatile storage (e.g., read-only memory), flash memory, or any combination of such memories.

The system memory 504 includes an operating system 505 and one or more program modules 506 suitable for running software application 520, such as one or more components supported by the systems described herein. The operating system 505, for example, may be suitable for controlling the operation of the computing device 500.

Furthermore, embodiments of the disclosure may be practiced in conjunction with a graphics library, other operating systems, or any other application program and are not limited to any particular application or system. This basic configuration is illustrated in FIG. 5 by those components within a dashed line 508. The computing device 500 may have additional features or functionality. For example, the computing device 500 may include additional data storage devices (removable and/or non-removable) such as, for example, magnetic disks, optical disks, and other computer readable media. Such additional storage is illustrated in FIG. 5 by a removable storage device 507 and a non-removable storage device 510.

The term computer readable media as used herein includes computer storage media. Computer storage media includes volatile and nonvolatile, removable and non-removable media implemented in any method or technology for storage of information, such as computer readable instructions, data structures, or program modules. The system memory 504, the removable storage device 507, and the non-removable storage device 510 are all computer storage media examples (e.g., memory storage). Computer storage media includes random access memory (RAM), read-only memory (ROM), electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be encoded by computer readable instructions, data structures, program modules, or other data in a modulated data signal, such as a carrier wave or other transport mechanism, and includes any information delivery media. The term "modulated data signal" describes a signal that has one or more characteristics set or changed in such a manner as to encode information in the signal. By way of example, communication media may include wired media such as a wired network or direct-wired connection, and wireless media such as acoustic, RF, infrared, and other wireless media.

As stated above, a number of program modules and data files may be stored in the system memory 504. While executing on the processing system 502, the program modules 506 (e.g., application 520) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. Output device(s) 514 such as a display, speakers, a printer, etc. may also be included. The aforementioned devices are examples and others may be used. The computing device 500 may include one or more communication connections 516 allowing communications with other computing devices 540. Examples of suitable communication connections 516 include radio frequency (RF) transmitter, receiver, and/or transceiver circuitry; universal serial bus (USB), parallel, and/or serial ports.

Figure 6A:
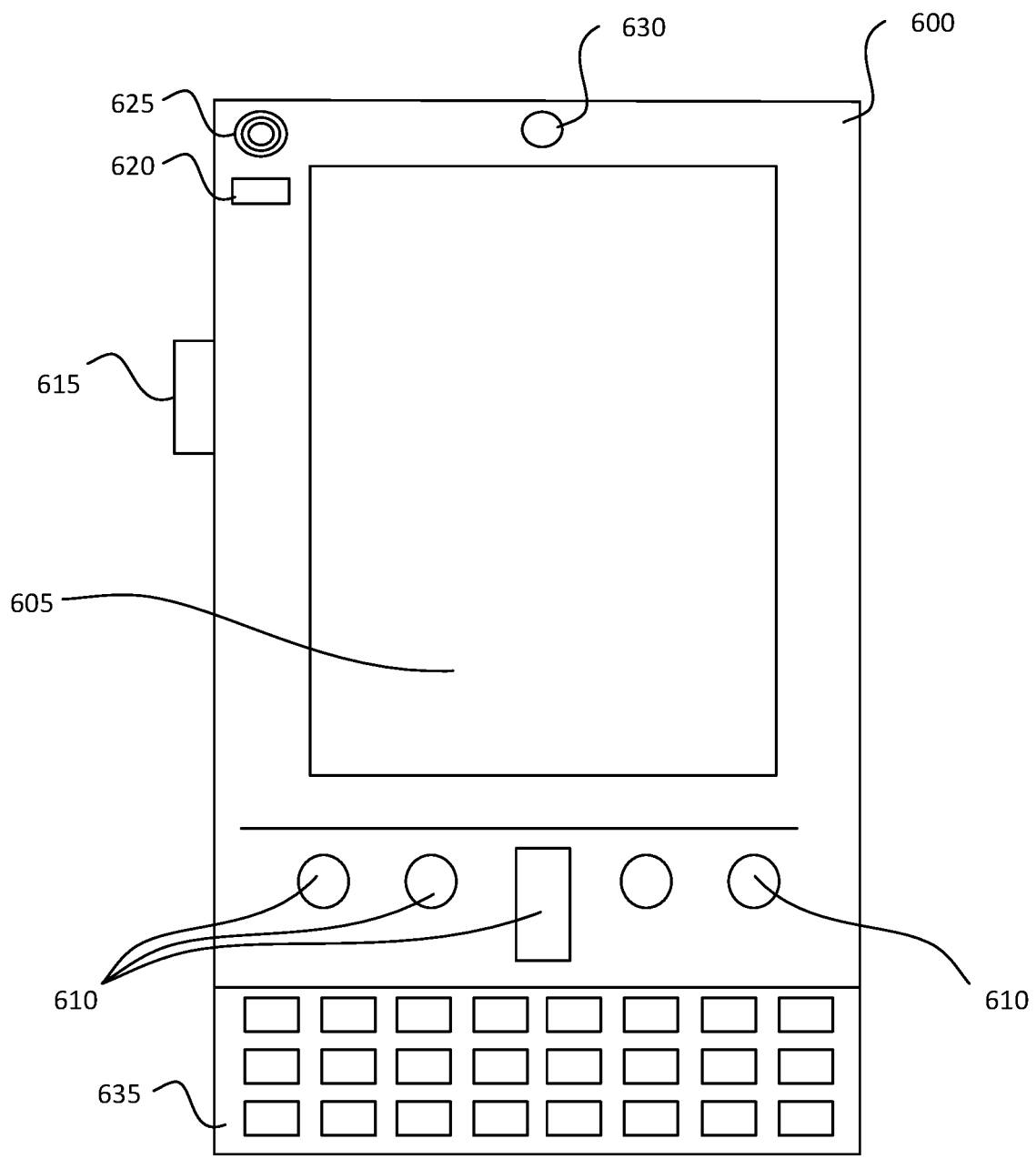
FIGS. 6A and 6B are simplified block diagrams of an example mobile computing device for practicing aspects of the present disclosure.
Figure 6B:
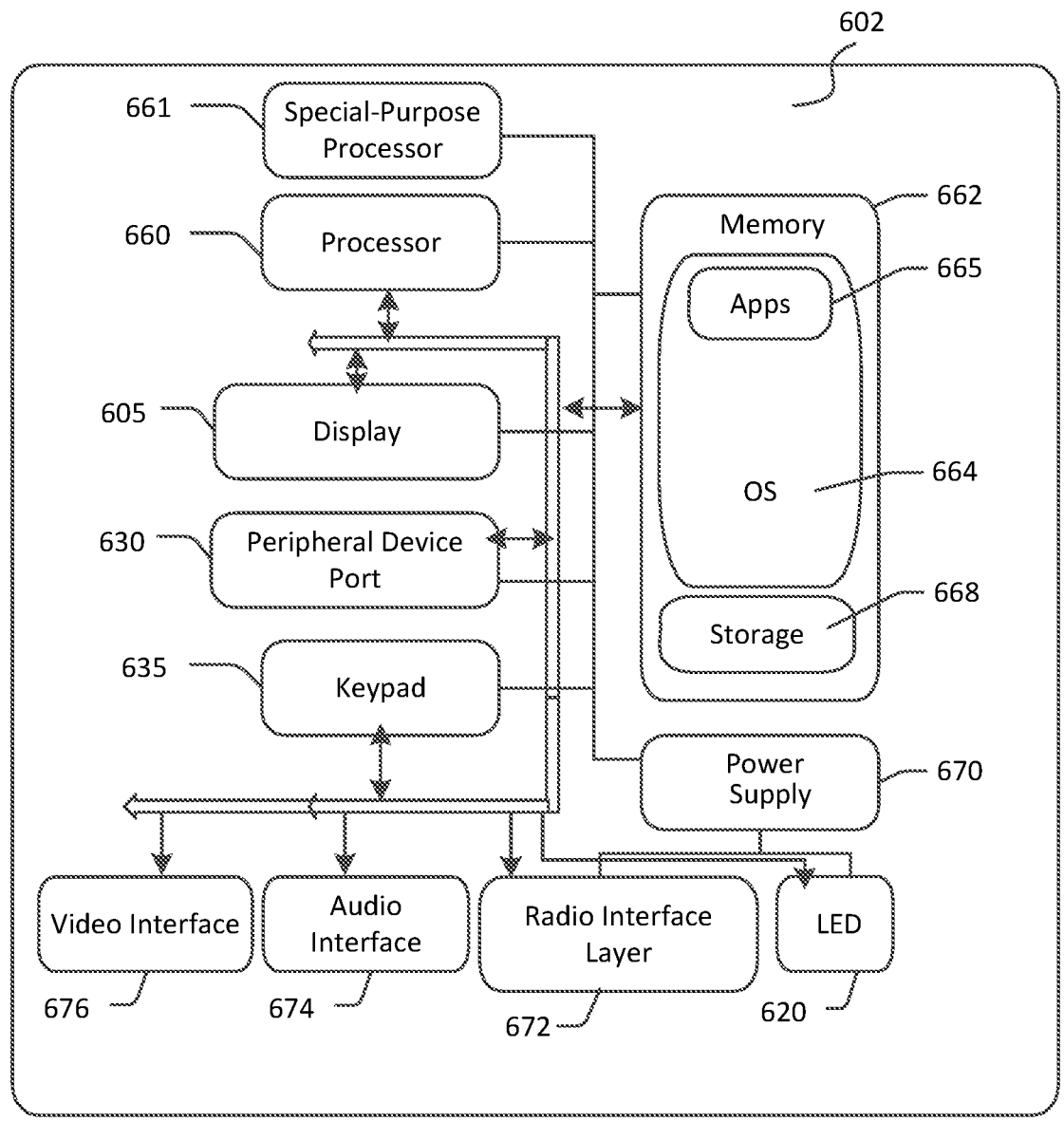

FIGS. 6A and 6B illustrate a mobile computing device 600, for example, a mobile telephone (e.g., a smart phone), wearable computer (such as a smart watch), a tablet computer, a laptop computer, and the like, with which embodiments of the disclosure may be practiced. In some aspects, the device is a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and may include one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 incorporates more or less input elements. For example, the display 605 may not be a touch screen in some embodiments.

In yet another alternative embodiment, the mobile computing device 600 is a mobile telephone, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 665 may be loaded into the memory 662 and run on or in association with the operating system (OS) 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 665 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device described herein (e.g., search engine, extractor module, relevancy ranking module, answer scoring module).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 665 via the OS 664, and vice versa.

The visual indicator 620 (e.g., light emitting diode (LED) may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor(s) (e.g., processor 660 and/or special-purpose processor 661) and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone also serves as an audio sensor to facilitate control of notifications, as will be described below. The system 602 may further include a video interface 676 that enables an operation of a peripheral device port 630 (e.g., an on-board camera) to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data may be readily transferred between computing devices for storage and use according to well-known data transfer and storage means, including electronic mail and collaborative data sharing systems.

Figure 7:
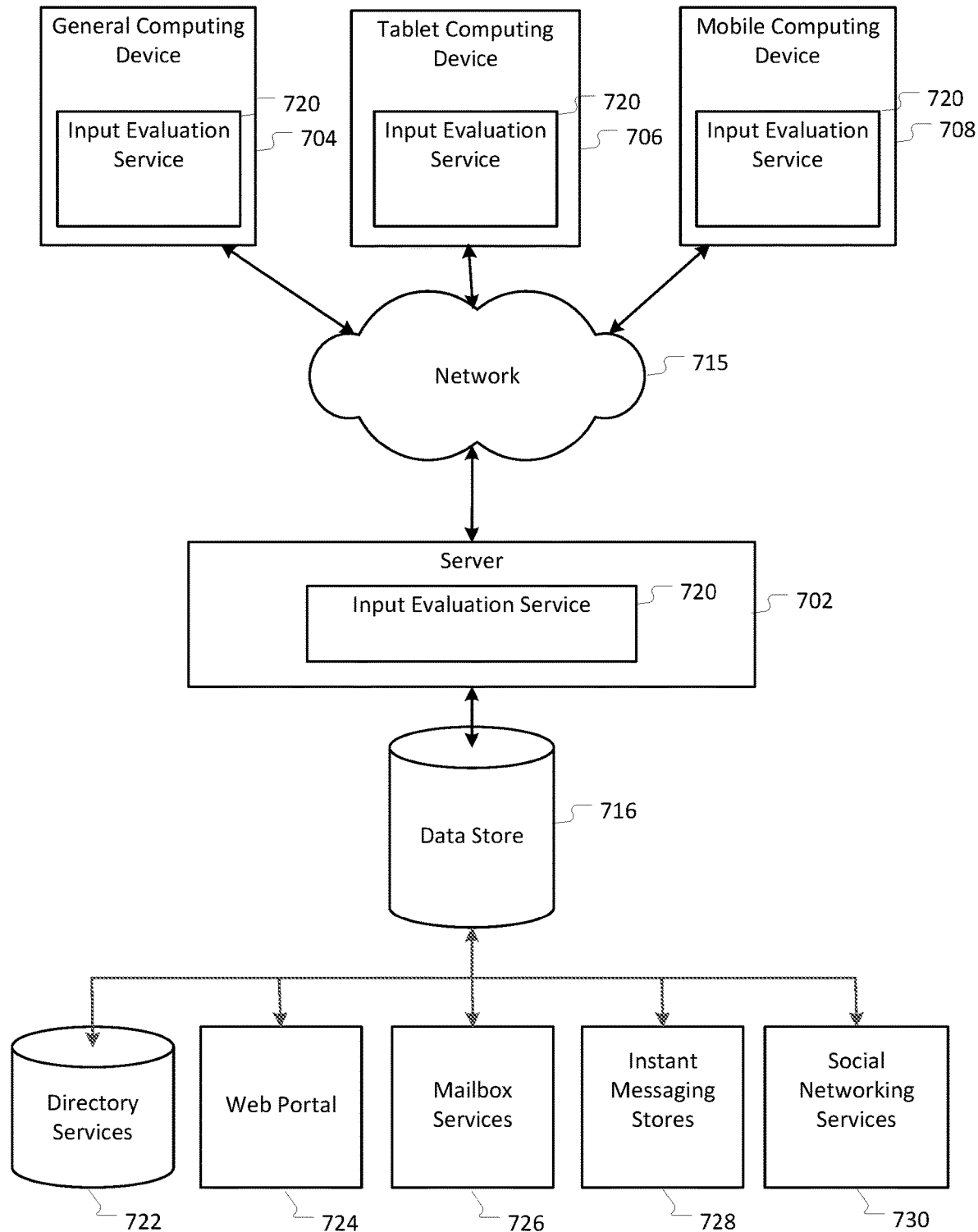
FIG. 7 is a simplified block diagram of an example distributed computing system for practicing aspects of the present disclosure.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using directory services 722, web portals 724, mailbox services 726, instant messaging stores 728, or social networking services 730.

An input evaluation service 720 may be employed by a client that communicates with server device 702, and/or input evaluation service 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the data store 716, in addition to receiving graphical data useable to be either pre-processed at a graphic-originating system, or post-processed at a receiving computing system.

As will be understood from the foregoing disclosure, one example of the technology relates to a method comprising: receiving, at a device, a first configuration request from a first software platform having a first toolset, the first configuration request comprising a first scenario configuration payload (SCP) file in a format that is normalized horizontally with respect to a second software platform having a second toolset that is different from the first toolset; parsing, based on a scenario configuration definition (SCD) file on the device, the first SCP file into an object model (OM), the SCD file comprising scenario metadata that is specific to the device; generating scenario instructions that are specific to the device by applying scenario metadata to the OM; and configuring the device based on the scenario instructions.

In another example, the technology relates to a system comprising: a processing system; and memory coupled to the processing system, the memory comprising computer executable instructions that, when executed by the processing system, perform a method. The method comprises: receiving, at a device, a first configuration request from a first software platform having a first toolset, the first configuration request comprising a first scenario configuration payload (SCP) file; configuring an application programming interface (API) of a configuration normalization platform on the device using the first SCP file; parsing, based on a scenario configuration definition (SCD) file on the device, the first SCP file into an object model (OM), the SCD file comprising scenario metadata that is specific to the device; generating scenario instructions that are specific to the device by applying the scenario metadata to the OM; and configuring the device based on the scenario instructions.

In another example, the technology relates to a non-transitory computer readable medium implemented on a device, the non-transitory computer readable medium having computer code that, when executed, implements a method. The method comprises: receiving, at a device, a first configuration request from a first software platform having a first toolset, the first configuration request comprising a first scenario configuration payload (SCP) file in a format that is normalized horizontally with respect to a second software platform having a second toolset that is different from the first toolset; configuring an application programming interface (API) of a configuration normalization platform on the device using the first SCP file; parsing, based on a scenario configuration definition (SCD) file on the device, the first SCP file into an object model (OM), the SCD file comprising scenario metadata that is specific to the device; and generating scenario instructions that are specific to the device by applying the scenario metadata to the OM.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method comprising:
   receiving, at a device, a first configuration request from a first software platform having a first toolset, the first configuration request comprising a first scenario configuration payload (SCP) file in a format that is normalized, by the first software platform, horizontally with respect to a second software platform having a second toolset that is different from the first toolset, wherein the SCP file is normalized by the first software platform using a set of name-value pairs describing one or more scenarios for configuration of the device;
   parsing, based on a scenario configuration definition (SCD) file on the device, the first SCP file into an object model (OM), the SCD file comprising scenario metadata that is specific to the device;
   generating scenario instructions that are specific to the device by applying the scenario metadata to the OM; and
   configuring the device based on the scenario instructions such that features of the device behave consistently across the first software platform and the second software platform.

2. The method of claim 1, further comprising configuring an application programming interface (API) of a configuration normalization platform on the device using the first SCP file,
wherein the parsing of the first SCP file is performed in response to a call from the API to a parser of the device.

3. The method of claim 1, wherein:
   the format of the first SCP file is described in a public portion of the SCD file that is accessible to the first software platform;
   the SCD file comprises information described in a private portion of an SCD; and
   the SCD file was stored on the device at a time period corresponding to an operating system installation.

4. The method of claim 1, wherein the scenario metadata is associated with scenario metadata published at a repository.

5. The method of claim 1, wherein the scenario instructions are executed in accordance with a priority queue.

6. The method of claim 1, wherein parsing the first SCP file comprises validating the first SCP file or the OM based on the SCD file.

7. The method of claim 1, further comprising receiving, at the device, a second configuration request from the second software platform, the second configuration request comprising a second SCP file in a format that is normalized horizontally with respect to the first software platform.

8. A system comprising:
   a processing system; and
   memory coupled to the processing system, the memory comprising computer executable instructions that, when executed by the processing system, perform operations comprising:
   receiving, at a device, a first configuration request from a first software platform having a first toolset, the first configuration request comprising a first scenario configuration payload (SCP) file, wherein the SCP file is normalized by the first software platform using a set of name-value pairs describing one or more scenarios for configuration of the device;
   configuring an application programming interface (API) of a configuration normalization platform on the device using the first SCP file;
   parsing, based on a scenario configuration definition (SCD) file on the device, the first SCP file into an object model (OM), the SCD file comprising scenario metadata that is specific to the device;
   generating scenario instructions that are specific to the device by applying the scenario metadata to the OM; and
   configuring the device based on the scenario instructions such that features of the device behave consistently across the first software platform and a second software platform having a second toolset that is different from the first toolset.

9. The system of claim 8, wherein the parsing of the first SCP file is performed in response to a call from the API to a parser of the device.

10. The system of claim 8, wherein:
    a format of the first SCP file is described in a public portion of the SCD file that is accessible to the first software platform;
    the SCD file comprises information described in a private portion of an SCD; and
    the SCD file was stored on the device at a time period corresponding to an operating system installation.

11. The system of claim 8, wherein the scenario metadata is associated with scenario metadata published at a repository.

12. The system of claim 8, wherein the scenario instructions are executed in accordance with a priority queue.

13. The system of claim 8, wherein parsing the first SCP file comprises validating the first SCP file or the OM based on the SCD file.

14. The system of claim 8, further comprising receiving, at the device, a second configuration request from a second software platform, the second configuration request comprising a second SCP file in a format that is normalized horizontally with respect to the first software platform.

15. A non-transitory computer readable medium implemented on a device, the non-transitory computer readable medium having computer code that, when executed, implements a method comprising:
    receiving, at a device, a first configuration request from a first software platform having a first toolset, the first configuration request comprising a first scenario configuration payload (SCP) file in a format that is normalized, by the first software platform, horizontally with respect to a second software platform having a second toolset that is different from the first toolset, wherein the SCP file is normalized by the first software platform using a set of name-value pairs describing one or more scenarios for configuration of the device;
    configuring an application programming interface (API) of a configuration normalization platform on the device using the first SCP file;
    parsing, based on a scenario configuration definition (SCD) file on the device, the first SCP file into an object model (OM), the SCD file comprising scenario metadata that is specific to the device;
    generating scenario instructions that are specific to the device by applying the scenario metadata to the OM; and
    configuring the device based on the scenario instructions such that features of the device behave consistently across the first software platform and the second software platform.

16. The non-transitory computer readable medium of claim 15, wherein the parsing of the first SCP file is performed in response to a call from the API to a parser of the device.

17. The non-transitory computer readable medium of claim 15, wherein:
    the format of the first SCP file is described in a public portion of the SCD file that is accessible to the first software platform;
    the SCD file comprises information described in a private portion of an SCD; and
    the SCD file was stored on the device at a time period corresponding to an operating system installation.

18. The non-transitory computer readable medium of claim 15, wherein the scenario metadata is associated with scenario metadata published at a repository.

19. The non-transitory computer readable medium of claim 15, wherein the scenario instructions are executed in accordance with a priority queue.

20. The non-transitory computer readable medium of claim 15, wherein parsing the first SCP file comprises validating the first SCP file or the OM based on the SCD file.

* * * * *